(12) United States Patent
Kim et al.

(10) Patent No.: US 7,659,657 B2
(45) Date of Patent: Feb. 9, 2010

(54) FLAT FLUORESCENT LAMP WITH IMPROVED CAPABILITY OF LUMINANCE AND REDUCED INITIAL OPERATIONAL VOLTAGE

(75) Inventors: Chung Soo Kim, Seongnam-si (KR); Do Young Cho, Busan-si (KR); Jong Lee Park, Cheonan-si (KR); Hwan Woong Lee, Cheonan-si (KR)

(73) Assignee: Mirae Corporation, Seoul (KR)

( * ) Notice: Subject to any disclaimer, the term of this patent is extended or adjusted under 35 U.S.C. 154(b) by 369 days.

(21) Appl. No.: 11/785,031

(22) Filed: Apr. 13, 2007

(65) Prior Publication Data

US 2007/0247070 A1 Oct. 25, 2007

(30) Foreign Application Priority Data

Apr. 25, 2006 (KR) ............... 10-2006-0037211
Sep. 13, 2006 (KR) ............... 10-2006-0088433

(51) Int. Cl.
*H01J 1/62* (2006.01)
*H01J 63/04* (2006.01)

(52) U.S. Cl. .............. 313/485; 313/491; 313/483; 313/484; 313/492

(58) Field of Classification Search .............. None
See application file for complete search history.

(56) References Cited

U.S. PATENT DOCUMENTS

| | | | | |
|---|---|---|---|---|
| 5,479,069 A | * | 12/1995 | Winsor | 313/493 |
| 6,034,470 A | * | 3/2000 | Vollkommer et al. | 313/485 |
| 7,250,617 B2 | * | 7/2007 | Renau et al. | 250/492.21 |
| 2005/0083671 A1 | * | 4/2005 | Park et al. | 362/26 |
| 2005/0116607 A1 | * | 6/2005 | Park et al. | 313/485 |
| 2005/0122044 A1 | * | 6/2005 | Park et al. | 313/581 |
| 2005/0146892 A1 | * | 7/2005 | Park et al. | 362/560 |
| 2005/0258761 A1 | * | 11/2005 | Park et al. | 313/634 |
| 2006/0012276 A1 | * | 1/2006 | Hwang et al. | 313/234 |
| 2006/0043857 A1 | * | 3/2006 | Kim et al. | 313/234 |
| 2006/0049735 A1 | * | 3/2006 | Lee et al. | 313/234 |
| 2006/0125401 A1 | * | 6/2006 | Park et al. | 313/607 |
| 2006/0238093 A1 | * | 10/2006 | Park et al. | 313/234 |
| 2006/0267498 A1 | * | 11/2006 | Park et al. | 313/581 |

* cited by examiner

*Primary Examiner*—Nimeshkumar D. Patel
*Assistant Examiner*—Natalie K Walford
(74) *Attorney, Agent, or Firm*—KED & Associates, LLP

(57) ABSTRACT

A flat fluorescent lamp which can be used with an LCD display includes a plurality of discharge channels. Pairs of electrodes are formed on both ends of the discharge channels. Each of the plurality of channels has an emitting section at the middle, and electrode sections on both ends thereof. A width of the electrode sections is the same as that of the emitting section. However, a height of the electrode sections is greater than a height of the emitting section, resulting in the electrode section having a cross-sectional area that is larger than that of the emitting section.

18 Claims, 5 Drawing Sheets

FLAT FLUORESCENT LAMP WITH IMPROVED CAPABILITY OF LUMINANCE AND REDUCED INITIAL OPERATIONAL VOLTAGE

BACKGROUND

1. Field

The present invention relates to a flat fluorescent lamp for a display apparatus, and more particularly to flat fluorescent lamp for a display apparatus, capable of improving luminance uniformity without having to increase an initial operation voltage.

2. Background

There are two types of display apparatus: an emissive display apparatus and a non-emissive display apparatus. A liquid crystal display LCD is the typical non-emissive display apparatus, and it requires backlighting from behind the liquid crystal elements to display characters, images, and so forth.

There are basically two mechanical implementations of a backlight: edge lighting and surface lighting. The edge lighting approach uses one or more lamps, typically cold cathode fluorescent lamps (CCFL), at the edge of the display. A thin light guide distributes the light from the lamps evenly across the display surface. The surface lighting approach has a cavity configuration with cold cathode fluorescent lamps (CCFL) behind the LCD panel.

The surface light approach is generally superior in luminance, but inferior in luminance uniformity. The edge light approach is generally inferior in luminance, but superior in luminance uniformity.

FIG. 1 is a perspective view illustrating a disassembled structure of a conventional flat fluorescent lamp. FIG. 2 is a plan view illustrating the conventional flat fluorescent lamp. The conventional florescent lamp 100, as shown in FIGS. 1 and 2, is manufactured by assembly of a first substrate 110 and a second substrate 120. One or more channels 111 having the same cross-sectional area, are formed at regular intervals on the first substrate 110. The second substrate 120 has a flat surface. One or more discharge spaces are formed by assembly of the first substrate 110 and the second substrate 120.

A sealant 130 is dispensed along an edge of the second substrate 120 to create a joint between surfaces of the first substrate 110 and the second substrate 120 to assemble the first substrate 110 and the second substrate 120. The assembly of the first substrate 110 and the second substrate 120 results in channels 111 being physically separated from each other, thereby forming a plurality of discharge spaces. A discharge gas is introduced into the channels 111, i.e., the discharge spaces.

Electrodes 140 in the form of a belt are formed on both ends of upper and lower sides of the assembly of the first substrate 110 and the second substrate 120. A voltage is then applied to the electrodes 140. Each of the channels 111 includes an electrode section 111a where the electrodes 140 are formed, and an emitting section 111b where light is emitted. When a voltage is applied to the electrodes 140, electric discharges occur within the discharge spaces, thereby emitting light from the emitting sections 111b.

Each of the channels of the conventional flat fluorescent lamp 100 has electrode sections 111a and emitting sections 111b whose cross-sectional areas are the same. However, an inside space of the electrode sections 111a is smaller than an inside space of the emitting sections 111b. Because the inside space of the electrode sections is smaller, there are fewer electrons available to excite, and it takes a relatively long time or a relatively high voltage to get the flat fluorescent lamp 100 to initially light up. Thus, it is necessary to increase an initial discharge voltage to reduce the initial operating time for the flat fluorescent lamp 100. However, increasing in the initial discharge voltage results in excessive collisions between electrons within the channels 111, thereby shortening a life of the flat fluorescent lamp.

The electrode sections 111a are subject to transformation due to the high heat generated when a voltage is applied to the electrodes 140. Transformation of the electrode sections 111a brings about separation of the contact surfaces of the first substrate 110 and the second substrates 120 along the joint. Thus, the discharge gas within the channels may mix. Accordingly, luminance and luminance uniformity can deteriorate.

Uneven luminance of the flat fluorescent lamp may also occur due to temperature differences between the channels. The channels positioned at the middle of the fluorescent lamp are in a range of relatively high temperature and luminance is therefore high. The channels positioned at the sides of the fluorescent lamp are in a range of relatively low temperature and luminance is therefore low. The higher heat at the center results from positioning of a component such as an inverter on the middle of the back side of the fluorescent lamp, and/or from convection of the discharge gas between the channels with the flat fluorescent lamp in the upright position.

BRIEF DESCRIPTION OF THE DRAWINGS

The embodiments will be described in detail with reference to the following drawings in which like reference numerals refer to like elements, and wherein.

DETAILED DESCRIPTION

Figure 1:
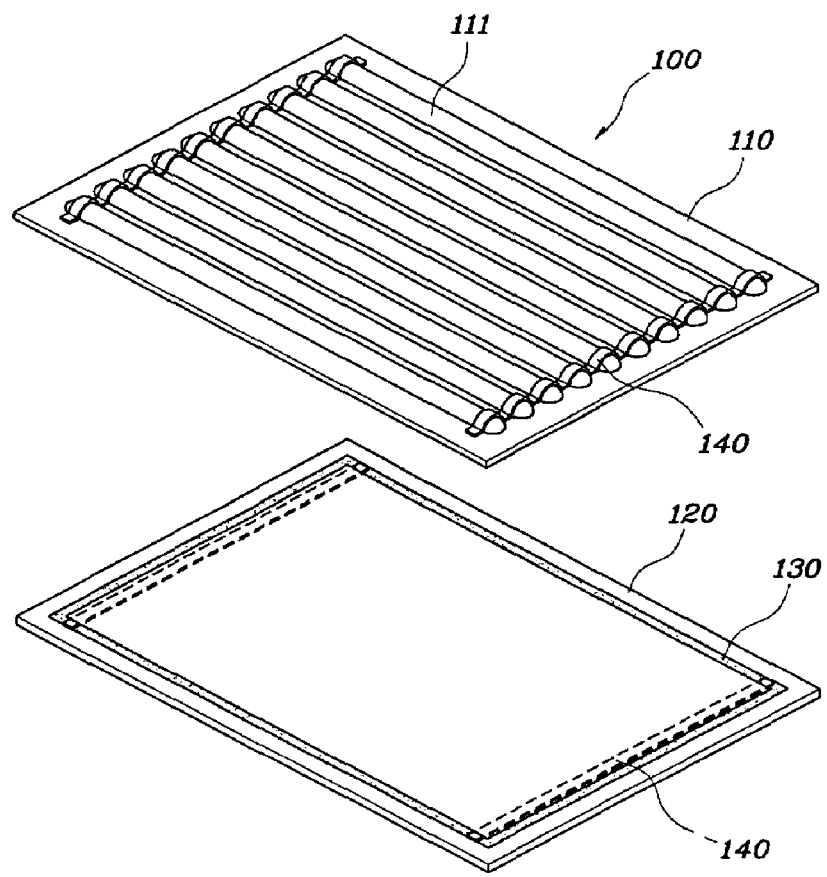
FIG. 1 is a perspective view illustrating a disassembled structure of a conventional flat fluorescent lamp.
Figure 2:
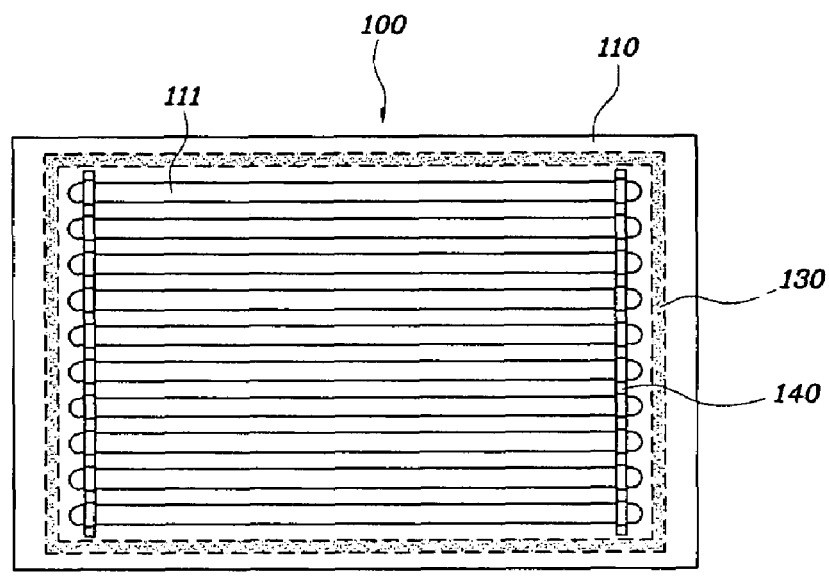
FIG. 2 is a plan view illustrating the conventional flat fluorescent lamp.
Figure 3:
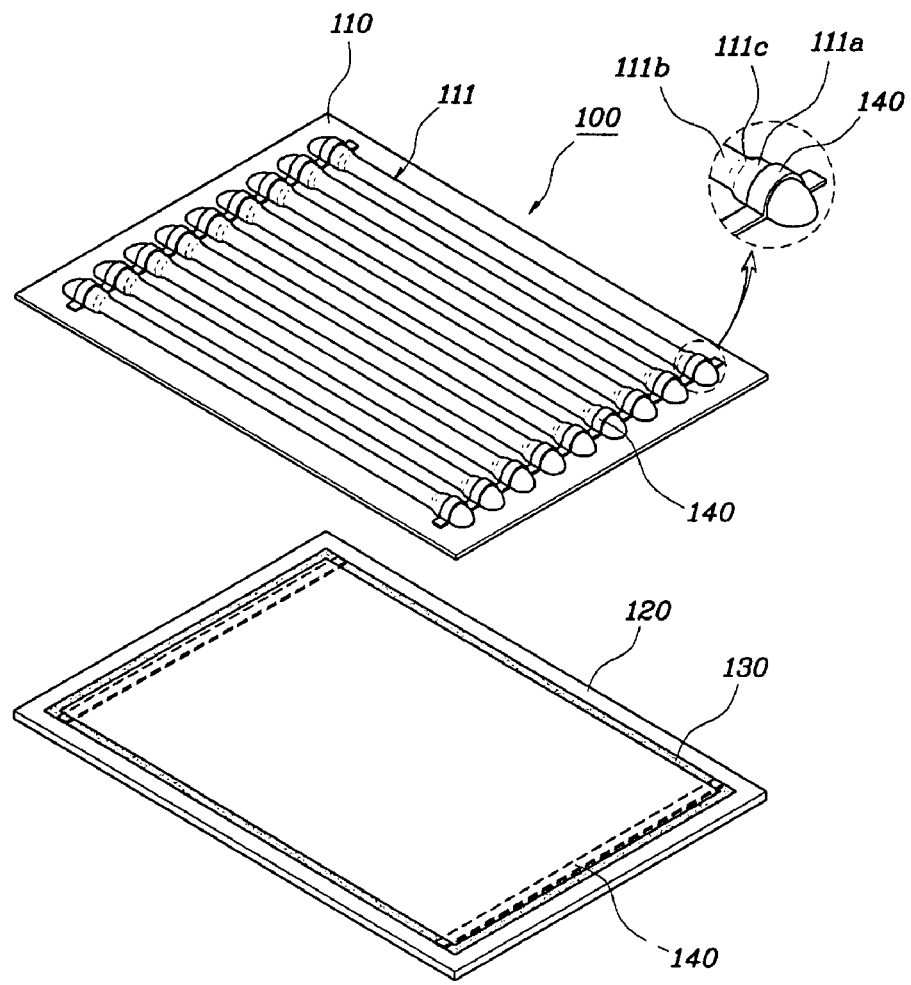
FIG. 3 is a plan view illustrating a flat fluorescent lamp according to a first embodiment.
Figure 4:
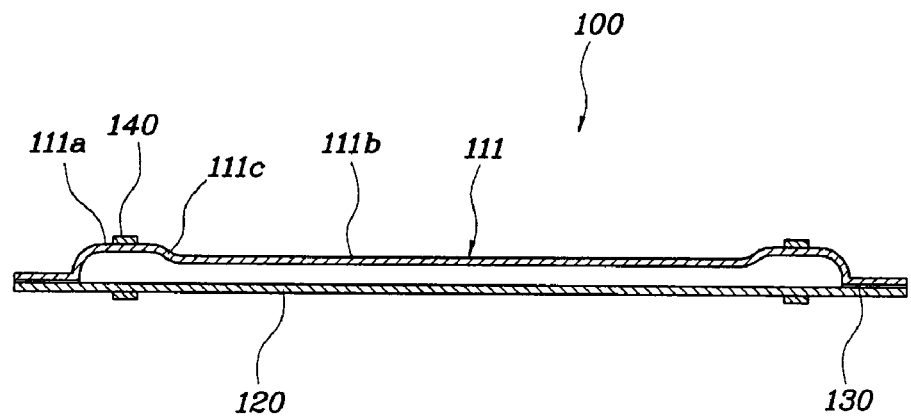
FIG. 4 is a cross-sectional view illustrating a flat fluorescent lamp according to the first embodiment.

FIG. 3 is a plan view illustrating a flat fluorescent lamp according to a first embodiment. FIG. 4 is a cross-sectional view illustrating the flat fluorescent lamp according to the first embodiment. In this embodiment, a plurality of channels having discharge spaces are formed at regular intervals on a first substrate 110. A discharge gas is introduced into the discharge spaces.

Each channel 111 includes electrode sections 111a and an emitting section 111b in between. Each of the electrode sections 111a has the same width as the emitting section 111b. However, the electrode sections 111a have a greater height than the emitting section 111b. Thus, a cross-sectional area of the electrode sections 111a is larger than that of the emitting sections 111b. The electrode section 111a is connected to the emitting section 111b through an inclined section 111c which slopes from the electrode section 111a to the emitting section 111b.

In this embodiment, the second substrate 120 is flat. The first substrate 110 is assembled with the second substrate 120 to manufacture the flat fluorescent lamp. Discharge spaces of the channels are formed after assembly of the first substrate 110 and the second substrate 120. However, in alternate embodiments, both the first and second substrates may be formed so that they have depressions which together form the discharge channels.

A sealant is dispensed in a given pattern on an edge of either or both of the first substrate 110 and the second substrate 120. Thereafter, a pressure is applied to the first substrate 110 and the second substrate 120, which are opposite to each other, for assembly of the first substrate 110 and the second substrate 120. The assembled substrates may also be heated to seal the substrates together.

A discharge gas is introduced into the discharge spaces of the channels 111 formed after the assembly of the first substrate 110 and the second substrate 120. Subsequent formation of electrodes 140 on the electrode sections 111a is a last step of manufacturing the flat fluorescent lamp 100.

When a voltage is applied to the electrode 140 of the flat fluorescent lamp, electrons are excited within the inside space of the electrode section 111a. The excited electrons enable a luminous material to emit light.

According to the first embodiment, the cross-sectional area of the electrode sections 111a are larger than the cross-sectional area of the emitting section 111b. The larger cross-sectional area results in a larger number of electrons being present and excited in the electrode section 111a. Because of the larger number of electrons that are present, it is possible to reduce the initial operation voltage. Furthermore, although the cross-sectional area of the electrode section 111a is larger than that of the emitting section 111b, the width of the electrode section 111a is the same as that of the emitting section 111b, thereby limiting flow of electrons between adjacent electrode sections 111a. This also contributes to an improvement in luminance uniformity.

Figure 5:
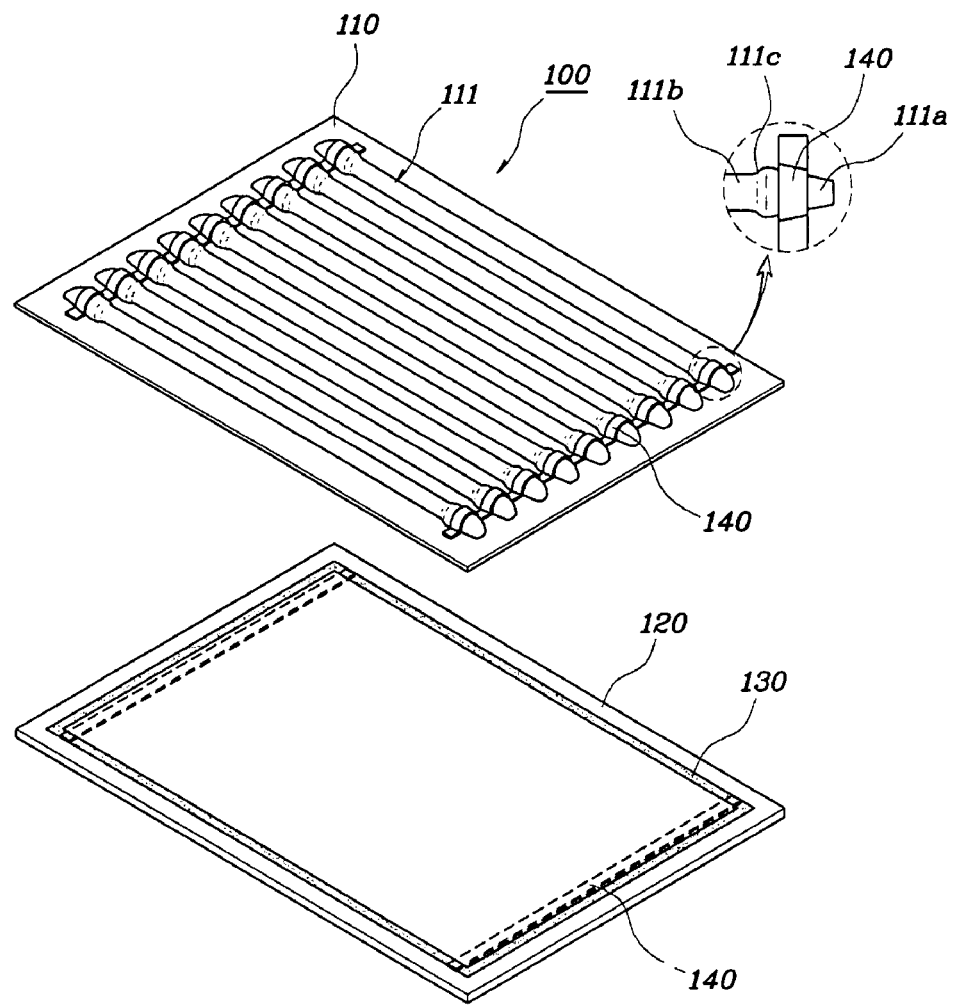
FIG. 5 is a perspective view illustrating a disassembled flat fluorescent lamp according to a second embodiment.
Figure 6:
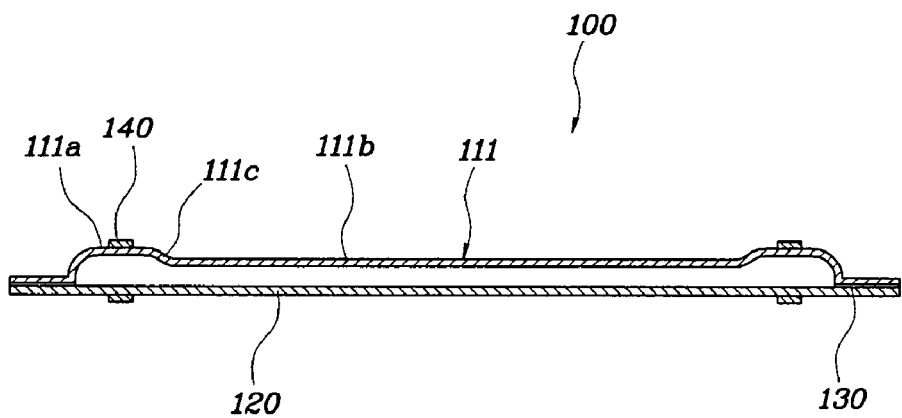
FIG. 6 is a cross-sectional view illustrating a flat fluorescent lamp according to the second embodiment.

A second embodiment further limits flow of electrons between adjacent electrode sections 111a in a flat fluorescent lamp to further enhance luminance uniformity. FIG. 5 is a plan view illustrating a flat fluorescent lamp according to the second embodiment. FIG. 6 is a cross-sectional view illustrating the flat fluorescent lamp according to the second embodiment.

The flat fluorescent lamp according to the second embodiment includes a first substrate 110 on which a plurality of channels 111 are formed, and a second substrate 120 which is assembled with the first substrate 110 to form a discharge space within each of the plurality of channels 111. A sealant is dispensed on either or both of the first substrate 110 and the second substrate 120 for assembly of the first substrate 110 and the second substrate 120. Electrode sections 111a are formed on both ends of each of the plurality of channels 111, wherein the electrode sections 111a, have a cross-sectional area that tapers in an outside direction.

A width of the electrode sections 111a is the same as that of the emitting section 111b, but a height of the electrode sections 111a is greater than that of the emitting section 111b. Thus, the cross-sectional area of the electrode sections 111a are larger than that of the emitting section 111b. However, the cross-sectional area of the electrode section 111a tapers down as it approaches the ends of the channels. Thus, a distance between the adjacent electrode sections 111a becomes gradually greater towards the ends of the channels. That is, the cross-sectional area of the electrode sections 111a according to the second embodiment tapers from a contact surface between the electrode section 111a and the emitting section 111b to an end of the channel. In addition, the height of the electrode section 111a may taper in the same manner.

The electrode section 111a is connected to the emitting section 111b with an inclined section 111c in between. A cross-sectional area of the inclined section 111c tapers from the electrode section to the emitting section.

The greater distance between ends of the adjacent electrode sections prevents electrons generated in the electrode sections 111a from flowing between the adjacent electron sections 111a when a voltage is applied to the electrodes. This contributes to enhancing luminance uniformity.

Furthermore, the inside space of the electrode section 111a may be larger than that of the emitting section 111b, thereby increasing the number of electrons. The increase in the number of electrons allows for a decreased initial operation voltage.

Uneven luminance of the flat fluorescent lamp may be due to positioning of a heat producing component such as an inverter on the middle of the back side of the fluorescent lamp, or convection of the discharge gas between the channels with the flat fluorescent lamp in the upright position.

Figure 7:
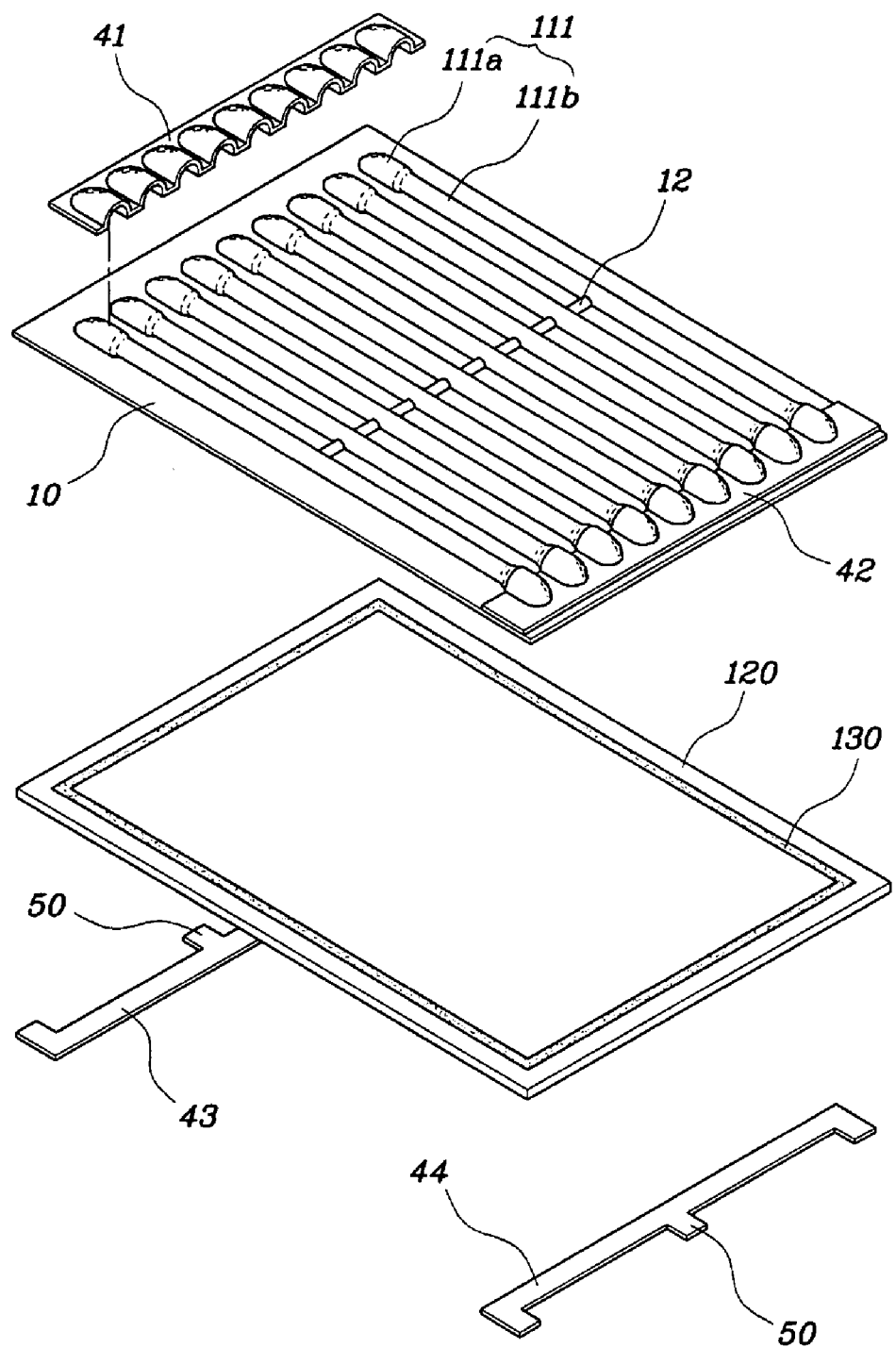
FIG. 7 is a perspective view illustrating a disassembled structure of a flat fluorescent lamp according to a third embodiment.
Figure 8:
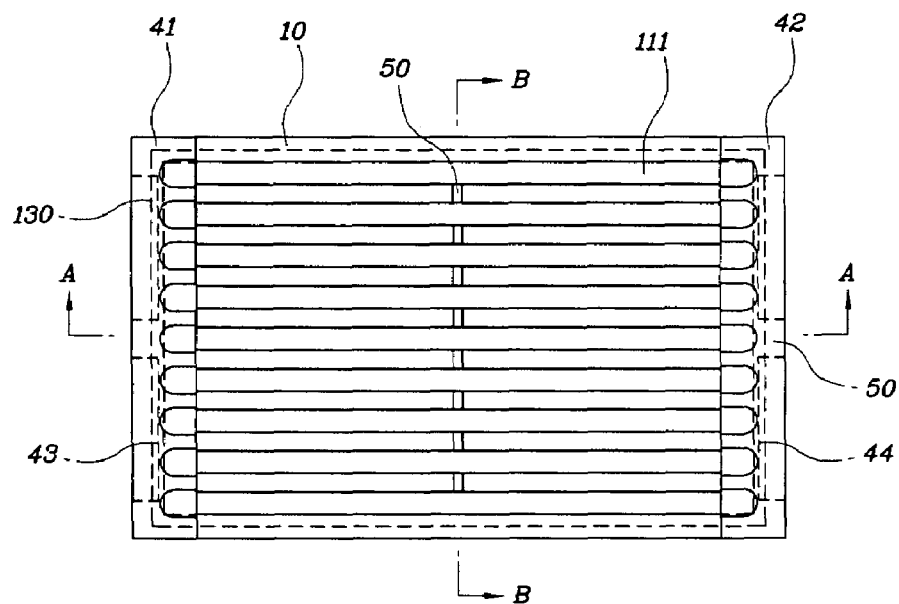
FIG. 8 is a plan view illustrating a flat fluorescent lamp according to the third embodiment.
Figure 9:
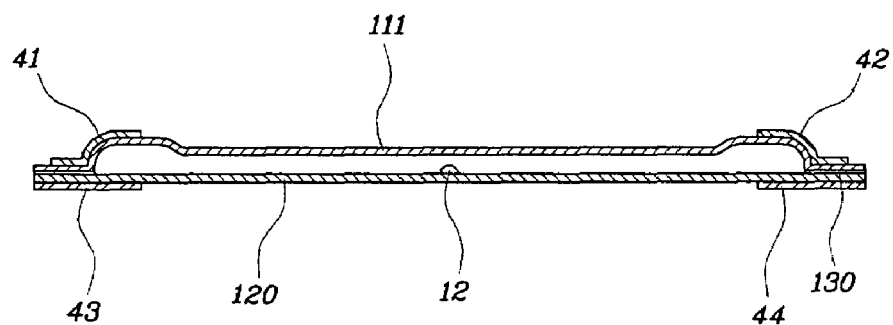
FIG. 9 is a cross-sectional view taken along section line A-A of FIG. 8.
Figure 10:
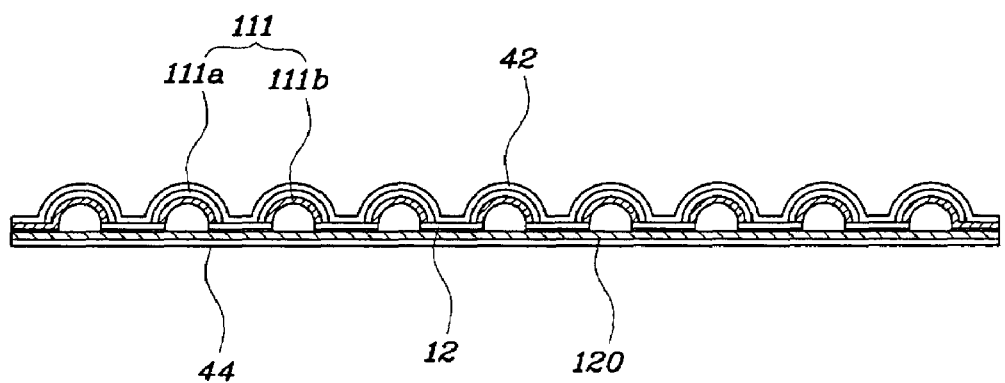
FIG. 10 is cross-sectional view taken along section line B-B line of FIG. 8.

A third embodiment of a flat fluorescent lamp has a structure of an electrode section in which luminance uniformity is improved. FIG. 7 is a perspective view illustrating a disassembled structure of the flat fluorescent lamp according to the third embodiment. FIG. 8 is a plan view illustrating a flat fluorescent lamp according to the third embodiment. FIG. 9 is a cross-sectional view taken along section line A-A of FIG. 8. FIG. 10 is cross-sectional view taken along section line B-B of FIG. 8.

A flat fluorescent lamp according to the third embodiment includes a first substrate 110 on which a plurality of channels are formed at regular intervals, and a second substrate 120 which is assembled with the first substrate 110 to form a discharge space within each of the plurality of channels 111. A sealant 130 is dispensed on an edge of either or both of the first substrate 110 and the second substrate 120 for assembly of the first substrate 110 and the second substrate 120. A first upper electrode 41 and a second upper electrode 42 are formed on both ends of an upper surface of the first substrate, respectively. A first lower electrode 43 and a second lower electrode 44 are formed on both ends of a lower surface of the second substrate, respectively. Extending electrodes 50 extend outside from the first lower electrode 43 and the second lower electrode 44, respectively. A connection passage 12 connects discharge spaces of each of the plurality of channels 111.

The plurality of channels 111 are formed in parallel with each other. Each channel 111 includes an emitting section 111b in the middle and electrode sections 111a formed at ends of the emitting section 111b. The electrode sections 111a constitute the ends of each channel. A width of the electrode sections 111a is the same as that of the emitting section 111b, but a height of the electrode sections 111a is greater than that of the emitting section 111b. Thus, a cross-sectional area of the electrode sections 111a is larger than that of the emitting section 111b.

The plurality of channels are connected to each other through the connection passage 12 The connection passage 12 may be formed at the middle of each of the channels 111. The second substrate 120, which is flat, is attached to the lower surface of the first substrate 110 to make the inside space of the channels 111 airtight.

The sealant 130 is dispensed on an edge of either or both of the first substrate 110 and the second substrate 120 to attach the second substrate 120 to the first substrate 110. Air is exhausted from the inside space of the channels 111, and discharge gas is introduced into the inside space of the channels 111, after assembly of the first substrate 110 and the second substrate 120. Air may be exhausted from, or discharge gas may be introduced into any one of the channels when the channels 111 are connected to each other through the connection passage 12.

The first upper electrode 41 and the second upper electrode 42 are formed on both ends of the electrode sections. The first lower electrode 43 and the second lower electrode 44 are formed on ends of a lower surface of the second substrate 120, respectively, to correspond to the first upper electrode 41 and the second upper electrode 42.

The first lower electrode 43 and the second lower electrode 44 further include extending electrodes 50, The extending electrodes 50 extend outside from the first lower electrode 43 and the second lower electrode 44, respectively. Addition of the extending electrodes 50 to the first lower electrode 43 and the second lower electrode 44 makes areas of the lower electrodes larger, without changing a distance between the first lower electrode 43 and the second lower electrode 44

The distance between the first lower electrode 43 and the second lower electrode 44 is the same over the whole flat fluorescent lamp. This makes luminance uniformity enhanced. The extending electrodes 50 increase the number of electrons occurring within the channels at relatively low temperatures.

The extending electrodes 50 may be formed on both ends of the first lower electrode 43 and the second lower electrode 44, and on each of the middle portions of the first and second lower electrodes. In these areas, temperature is relatively low. Addition of the extending electrodes 50 broadens the cross-sectional area of the electrodes 111a, thus making it possible to generate more electrons. As a result, luminance uniformity is enhanced. Extending electrodes 50 of any size may be formed in any part of the first lower electrode and the second lower electrode, depending upon the temperature of the inside space of the channel.

A flat fluorescent lamp according to the third embodiment includes the electrode sections 111a with the broadened discharge areas which contributes to increasing discharge efficiency.

An amount of electric current is increased in the channels overlapping with the extending electrodes 50, thus increasing the number of generated electrons. As a result, the initial operation time is decreased for the flat fluorescent lamp. Temperature difference is compensated for between the channels 111 and luminance uniformity is therefore enhanced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although a number of illustrative embodiments have been described, it should be understood that numerous other modifications and embodiments can be devised by those skilled in the art that will fall within the spirit and scope of the principles of this disclosure. More particularly, various variations and modifications are possible in the component parts and/or arrangements of the subject combinations. In addition to variations and modifications in the component parts and/or arrangements, alternative uses will also be apparent to those skilled in the art.

What is claimed is:

1. A flat fluorescent lamp with a plurality of channels, comprising:
    a first substrate on which a plurality of channels are formed;
    a second substrate that is assembled to the first substrate to form a discharge space within each of the plurality of channels, wherein each of the plurality of channels has an emitting section at a middle thereof and electrode sections on opposite ends thereof, the emitting section being connected to the electrode sections, and wherein a transverse cross-sectional area of the electrode sections is larger than a transverse cross-sectional area of the emitting section;
    first and second upper electrodes formed at first and second ends, respectively, of the first substrate over the electrode sections;
    first and second lower electrodes formed on first and second ends, respectively, of the second substrate under the electrode sections; and
    extending electrodes that extend outward from the first lower electrodes and the second lower electrodes, and wherein a length of each of the extending electrodes varies depending upon a temperature of adjacent channels.

2. The flat fluorescent lamp of claim 1, wherein the extending electrodes are formed on each of the first and second lower electrodes.

3. The flat fluorescent lamp of claim 1, wherein the extending electrodes extend from the first and second lower electrodes towards ends of the channels.

4. The flat fluorescent lamp of claim 1, wherein the extending electrodes are formed on both ends and at the middle of each of the first and second lower electrodes.

5. The flat fluorescent lamp of claim 1, further comprising a connection passage that operatively couples the plurality of emitting sections.

6. The flat fluorescent lamp of claim 5, wherein the connection passage allows gas within the channels to flow freely between the channels.

7. The flat fluorescent lamp of claim 5, wherein the connection passage intersects approximately at the middle of each channel.

8. The flat fluorescent lamp of claim 1, wherein a width of the electrode sections of each channel is substantially the same as a width of the emitting section of the channel.

9. The flat fluorescent lamp of claim 8, wherein a height of the electrode sections of each channel is greater than a height of the emitting section of the channel.

10. A flat fluorescent lamp having a plurality of channels, comprising:
    a first substrate on which a plurality of channels are formed;

a second substrate coupled to the first substrate to form a discharge space within each of the plurality of channels, wherein each of the plurality of channels includes electrode sections on opposite ends thereof and an emitting section between the opposite ends and being connected to the electrode sections, and wherein a transverse cross-sectional area of the electrode sections is larger than a transverse cross-sectional area of the emitting section;

first upper electrodes and second upper electrodes formed on the electrode sections at first ends and second ends, respectively, of the first substrate;

first lower electrodes and second lower electrodes formed under the electrode sections at the first ends and the second ends, respectively, of the second substrate; and a plurality of extending electrodes that extend outward from the first lower electrodes and the second lower electrodes, and wherein a length of each of the extending electrodes varies based on a temperature of adjacent channels.

11. The flat fluorescent lamp of claim 10, wherein the plurality of extending electrodes are formed on each of the first lower electrodes and the second lower electrodes.

12. The flat fluorescent lamp of claim 10, wherein the plurality of extending electrodes extend from the first lower electrodes and the second lower electrodes towards ends of the channels.

13. The flat fluorescent lamp of claim 10, wherein the plurality of extending electrodes are formed on both ends and at a middle portion of each of the first lower electrodes and the second lower electrodes.

14. The flat fluorescent lamp of claim 10, further comprising a connection passage that couples the corresponding emitting section from several of the channels.

15. The flat fluorescent lamp of claim 14, wherein the connection passage allows gas within the channels to flow between the channels.

16. The flat fluorescent lamp of claim 14, wherein the connection passage intersects approximately at a middle portion of each channel.

17. The flat fluorescent lamp of claim 10, wherein a width of the electrode sections of each channel is substantially the same as a width of the corresponding emitting section of the channel.

18. The flat fluorescent lamp of claim 17, wherein a height of the electrode sections of each channel is greater than a height of the corresponding emitting section of the channel.

* * * * *

UNITED STATES PATENT AND TRADEMARK OFFICE
CERTIFICATE OF CORRECTION

PATENT NO. : 7,659,657 B2 Page 1 of 1
APPLICATION NO. : 11/785031
DATED : February 9, 2010
INVENTOR(S) : Chung Soo Kim et al.

It is certified that error appears in the above-identified patent and that said Letters Patent is hereby corrected as shown below:

On the Title Page Item (73) should read,

(73)    Assignee: ~~Mirae Corporation, Seoul (KR)~~ Math Bright Technology Co., LTD., Taiwan (TW) and Lumiette Inc., United States of America (USA)

Signed and Sealed this

Sixth Day of April, 2010

David J. Kappos
*Director of the United States Patent and Trademark Office*